United States Patent [19]

Frignac et al.

[11] 4,244,294
[45] Jan. 13, 1981

[54] STOWABLE NOZZLE PLUG AND METHOD FOR AIR BREATHING MISSILE

[75] Inventors: Jean-Paul Frignac, Scottsdale; Dennis W. Swain, Phoenix, both of Ariz.; Arthur J. Kavie, Goddard, Kans.

[73] Assignee: The Garrett Corporation, Los Angeles, Calif.

[21] Appl. No.: 954,004

[22] Filed: Oct. 23, 1978

[51] Int. Cl.$^2$ ............................................. F42B 15/10
[52] U.S. Cl. ................................ 102/49.3; 60/39.02; 60/39.33; 60/242; 60/271; 102/49.4; 181/215; 239/265.19
[58] Field of Search .................. 60/39.02, 39.33, 242, 60/271; 102/49.3, 49.4; 181/215; 239/265.19

[56] References Cited

U.S. PATENT DOCUMENTS

| 2,408,099 | 9/1946 | Sherman | 239/265.19 |
| 2,483,401 | 10/1949 | Cole | 239/265.19 |
| 2,683,961 | 7/1954 | Britton et al. | 60/39.02 X |
| 2,828,603 | 4/1958 | Laucher | 60/271 X |
| 2,987,879 | 6/1961 | Brown | 181/215 X |
| 3,060,679 | 10/1967 | Schmitt | 60/271 X |
| 3,526,094 | 9/1970 | de La Goutte et al. | 60/39.33 X |
| 4,109,867 | 8/1978 | Ereling, Jr. | 60/242 |

Primary Examiner—Leland A. Sebastian
Attorney, Agent, or Firm—James W. McFarland; Albert J. Miller

[57] ABSTRACT

A missile with an air breathing gas turbine propulsion engine configured with a translating exhaust plug nozzle to minimize longitudinal length of the engine section.

19 Claims, 4 Drawing Figures

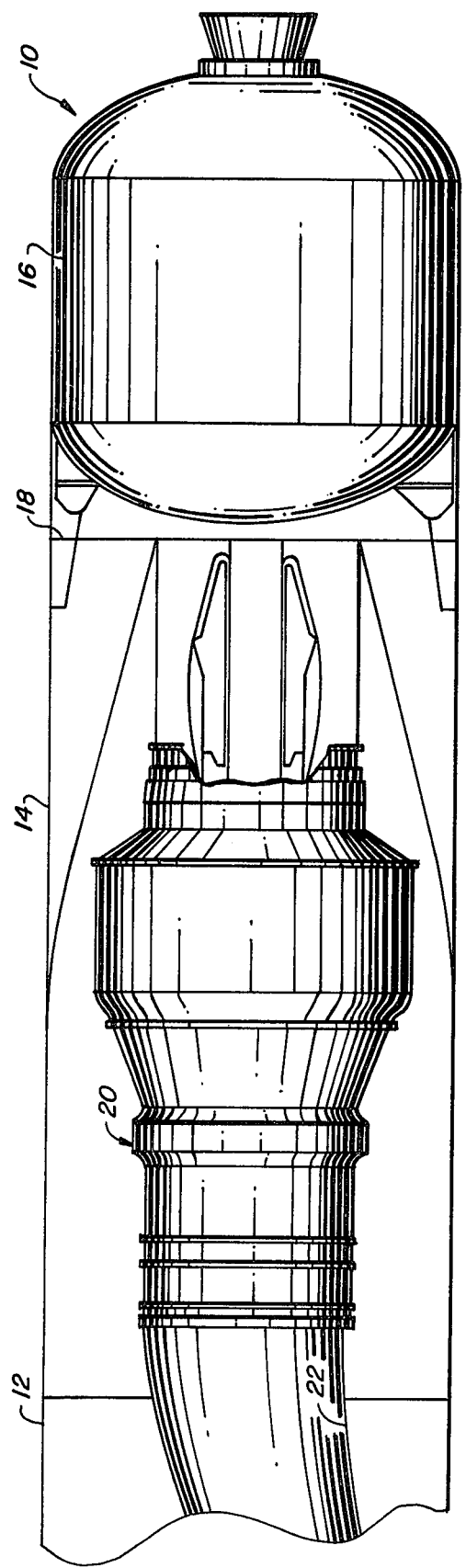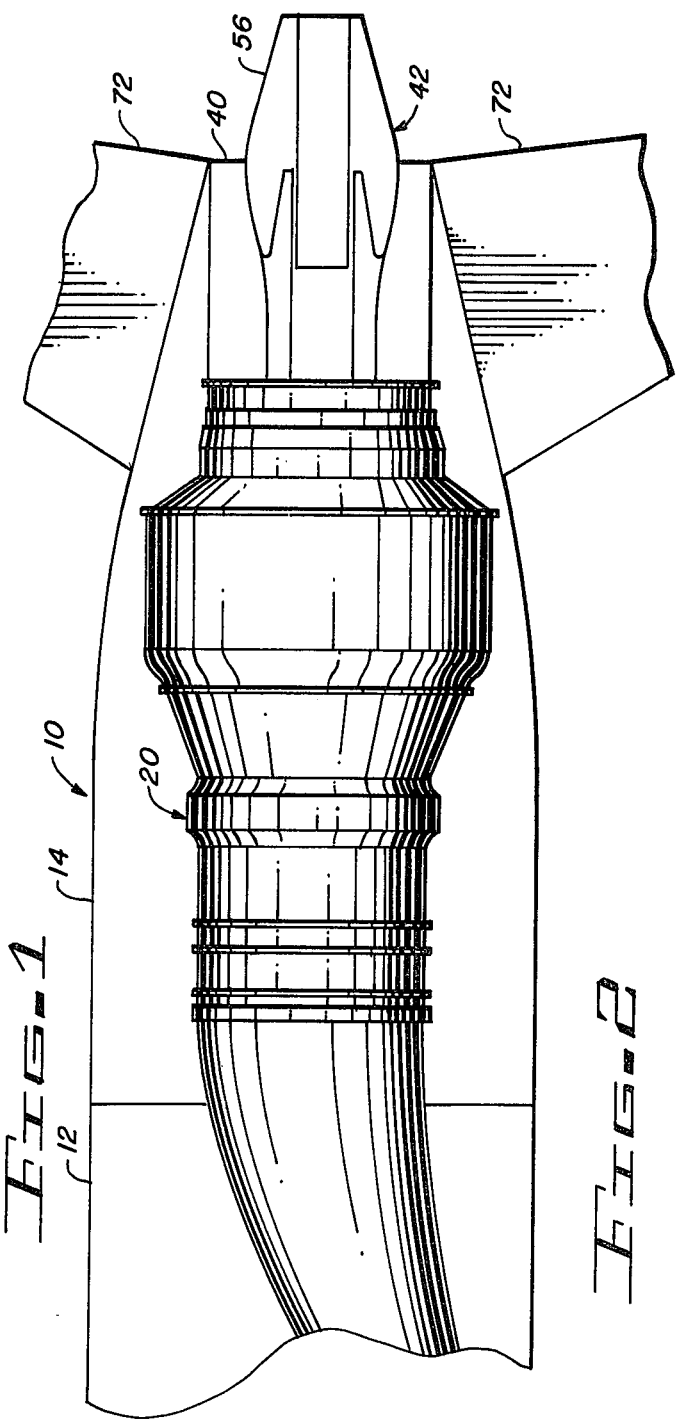

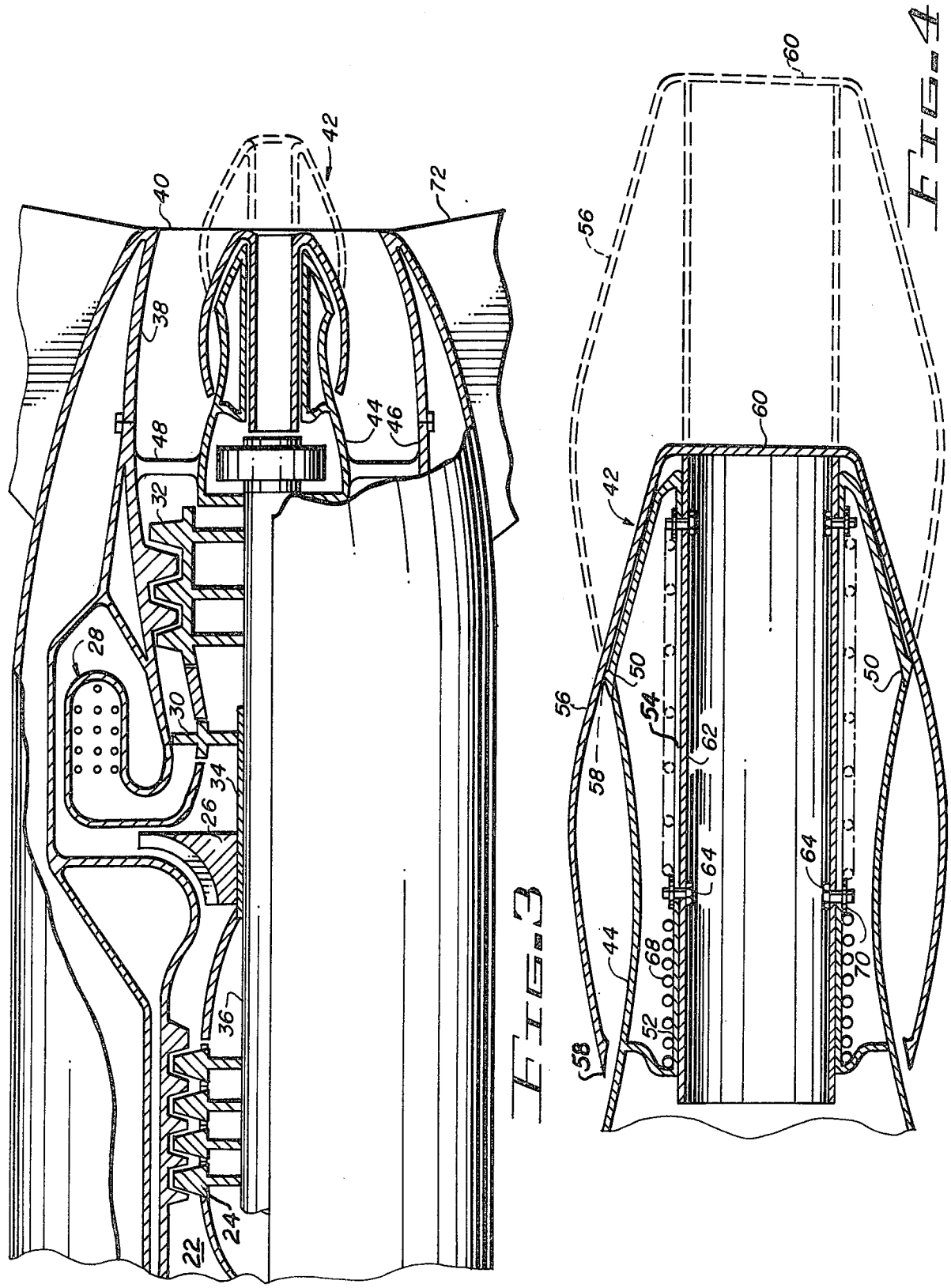

STOWABLE NOZZLE PLUG AND METHOD FOR AIR BREATHING MISSILE

BACKGROUND OF THE INVENTION

This invention relates to air breathing missiles, and relates more particularly to improved structure for gas turbine engines for propelling such missiles.

Missiles of the type referred to are characteristically of generally elongated configuration and present certain storage problems due to their length. It is also critical that the maximum portion of such missiles be utilized for fuel and/or payload. Thus, reduction in the overall longitudinal length of the propulsion engine for the missile can be of utmost importance.

SUMMARY OF THE INVENTION

Accordingly, it is an important object of the present invention to provide an improved gas turbine engine and air breathing missile therefor, and method for minimizing the size of the gas turbine engine without sacrifice or performance.

Another important object of the present invention is to provide an improved gas turbine engine structure and method which minimizes the size of the engine to permit maximum fuel/payload capabilities for the missile, and which also provides a compact storage configuration for the missile.

Another important object of the present invention is to provide an improved method and apparatus for providing a translating exhaust nozzle plug for the gas turbine engine in order to minimize its longitudinal length without sacrifice of performance.

More particularly, the present invention conemplates a gas turbine engine for an air breathing missile having an exhaust end at one end of the missile which normally incorporates a power launch booster. After launch the booster is jettisoned and the exhaust nozzle plug of the gas turbine engine automatically deploys outwardly beyond the exhaust end of the missile in order to present an optimal exhaust nozzle area and configuration for design condition operation of the gas turbine engine. Prior to translation of the exhaust nozzle plug to its operating position, the plug is stowed totally inside the missile housing in order to minimize the longitudinal length of the housing of the missile when stowed, and yet to maximize the fuel/payload compartment of the missile.

These and other objects and advantages of the present invention are specifically set forth in or will become apparent from the following detailed description of a preferred embodiment of the present invention when read in conjunction with the accompanying drawings.

BRIEF DESCRIPTION OF THE DRAWINGS

In the drawings:

FIG. 1 is a partial elevational view with portions of the engine compartment shown in a cross-section to reveal details of construction;

FIG. 2 is a view similar to FIG. 1 but with the missile in its operating condition;

FIG. 3 is an enlarged, elevational, partially cross-sectional view of the gas turbine engine as contemplated by the present invention; and FIG. 4 is a further enlarged, detailed cross-sectional elevational view of the translating exhaust plug nozzle in its stowed position, and showing its operating position in dashed lines.

DETAILED DESCRIPTION OF THE PREFERRED EMBODIMENT

Referring now more particularly to the drawings, a longitudinally elongated air breathing, subsonic missile is generally denoted by the numeral 10. The missile 10 includes a forward fuel/payload compartment 12, a rearwardly located engine compartment 14, and a power boost launcher 16 which is releasably attached at an exhaust end 18 of the missile. Disposed within compartment 14 is an air breathing gas turbine engine generally denoted by the numeral 20. An air inlet duct 22 for engine 20 passes through a portion of the fuel payload compartment 12 to an inlet (not shown) on the exterior of the missile 10. A typical gas turbine engine as illustrated in FIG. 3 incorporates a compressor section such as plurality of serially arranged axial compressors 24 and a final stage centrifugal compressor 26. Compressed airflow is delivered to a combustion chamber 28 in conventional fashion to be heated and then exhausted across first and second stage turbines 30 and 32. The first stage turbine drives compressor 26 through a shaft 34 while the second stage turbines 32 drive the axial compressors 24 through a concentric shaft 36. Gas flow from the second stage turbines 32 is exhausted through an exhaust duct 38 and past an exhaust nozzle plane 40, which is in alignment with the exhaust end 18 of the missile, to propel the missile.

Disposed centrally within exhaust duct 38 is a translatable exhaust plug nozzle generally noted by the numeral 42. The nozzle includes a stationary core member 44 which is secured to the engine housing 46 via struts 48. The fixed portion 44 of the core member has a varying diameter, concave outer wall of generally circular cross-section with an enlarged diameter portion adjacent the exhaust end of the engine. This outer wall and its enlarged diameter portion thus defines an annular circular shoulder 50. The core member 44 further includes an inner wall 52 of generally constant diameter extending longitudinally and concentrically to the outer wall of the core member. Inner wall 52 has open inner and outer ends respectively secured to the outer wall of the core member. The inner wall 52 further includes one or more slots or openings 54 extending along a substantial length thereof.

The translatable portion of the exhaust plug nozzle 42 further includes a translatable section which includes a convex, longitudinally extending, generally cylindrical outer wall 56 of varying diameter. The inner end 58 of the outer wall is open, while the outer end is closed by a transverse end wall 60. The inner end 58 of the translating section outer wall has a diameter somewhat smaller than the diameter of shoulder 50 so that upon longitudinal translation of the outer wall 56, its inner end 58 comes into contact with circular shoulder 50. In the stowed position illustrated by solid lines in FIG. 4 it will be noted that the convex outer wall 56 of the translating section is in overlying concentric surrounding relationship to the concave inner wall of the core member 44.

The translating section of the exhaust plug further includes a longitudinally extending, cylindrical, generally constant diameter inner wall 62 secured to transverse end wall 60. Translating inner wall 62 fits closely inside and is guided upon the stationary inner wall 52 of core member 44. The translating inner wall 62 further carries a one or more shoulder stops 64 which extend through respective openings 54 in stationary inner wall 52. A spring 66 is included just outside the core member inner wall 52 and acts against appropriate washers 70 and the shoulder stops 64 to provide a biasing force urging the inner wall 62, attached transverse wall 60, and convex outer wall 56 longitudinally outwardly relative to the exhaust end of the missile.

In operation, the missile 10 is stowed within a dimensionally limited environment in the configuration illustrated in FIG. 1 with the booster 16 attached, and with the translating exhaust nozzle plug 42 having its translating outer portion disposed totally inside the outer confines of the missile housing and without passing through the exhaust plane 40 at the exhaust end 18 of the missile. In this configuration, the booster closes the exhaust port and holds the translating movable portion of the exhaust nozzle in the stowed position illustrated. In this manner the overall longitudinal length of the engine section 14 of the missile is minimized in length for storage.

The missile is launched with plug 42 still stowed. Energization of booster 16 provides the propulsive power to launch and drive the missile during the initial portion of its mission. Once the booster is expended, it is automatically detached from the remaining missile housing, and as illustrated in FIG. 2 control fins 72 may also be normally deployed for cruise operation of the missile.

With release of the booster, spring 68 is effective to shift the translatable portion of the exhaust plug nozzle rightwardly in the views illustrated to an operating position wherein the movable portion thereof extends beyond the exhaust plane 18 of the engine and into the zone originally occupied by booster 16. More particularly, the exhaust nozzle plug translating section shifts rightwardly until the open inner end 58 of the outer section engages upon and is limited by the annular shoulder 50. In such disposition, the nozzle core member 44 along with the movable section thereof cooperate to define an exhaust nozzle having an optimal exhaust nozzle area at the exhaust plane 40 for preselected design condition operation of the engine. The concave and convex portions of walls 44 and 56 define a convergentdivergent-type of nozzle of annular configuration in cooperation with the outer wall of the exhaust opening 38. It is important to note that upon release of the booster, the translating outer portion 56 automatically translates outwardly to its single operating position presenting the optimal fixed nozzle area at the exhaust plane for design condition operation of the engine.

If desired, the biasing spring 68 may be eliminated in certain arrangements. The translating exhaust plug is still automatically shifted to its operating position upon initiation of operation of gas turbine engine. More particularly, the exhaust gas flow from the turbine stages 32 enters inside outer wall 56 of the translating portion, which in cooperation with the closed end plug 60, effectively define a piston shifted rightwardly by the pressurized exhaust gas flow from the engine. Thus the spring 68 and/or the flow of exhaust gas from the engine constitute urging means for automatically shifting the translating portion of the exhaust nozzle plug to its operating position upon release of the launch booster.

It will be apparent that other mechanisms may well also be utilized in order to translate the exhaust nozzle plug to its single operating position. For instance, a lanyard may be attached between the booster 16 and the outer wall 56 so that upon release of the booster 16, the wall 56 is pulled outwardly to its operating position.

Upon the after translation of plug 42 to the operating position shown in full in FIG. 2, and shown in dashed lines in FIGS. 3 and 4, the gas turbine engine is operated in a normal manner at subsonic conditions for subsonic cruise operation of the missile.

From the foregoing it will be apparent that the present invention also contemplates an improved method of stowing and subsequently operating a subsonic missile which is propelled by a gas turbine engine of the air breathing type, the method including stowing the missile with a boost launcher attached thereto in a dimensionally limited environment in the longitudinal direction, then launching the missile by firing the boost launcher with the translating exhaust plug remaining in its retracted position during operation of the launcher. Next the launcher is released from the missile and the plug 42 automatically translates outwardly to its single operating position extending beyond the exhaust end of the missile and presenting an optimal, fixed, thrust nozzle exhaust area at the exhaust end for subsonic design condition operation of the engine. After translation of the plug the engine is operated at substantially optimal, subsonic design conditions to propel the missile during cruise.

While a particular embodiment of the invention has been described in detail above, it will be apparent to those skilled in the art that various alterations and modifications may be made. Accordingly, the foregoing detailed description should be considered exemplary in nature and not as limiting to the scope and spirit of the invention as set forth in the appended claims.

Having described the invention with sufficient clarity that those skilled in the art may make and use it, we claim:

1. An air breathing missile configured for storage in an environment dimensionally limited in a longitudinal direction, comprising:
   a longitudinal housing having a forward fuel/payload compartment, a rear engine compartment, and a rear exhaust end;
   an air breathing gas turbine engine arranged in said engine compartment to define a thrust exhaust nozzle having an exhaust plane at said exhaust end;
   a power launch booster releasably secured to said housing at said exhaust end when said engine is non-operable; and
   a longitudinally translatable exhaust plug on said engine disposed in a stowed position within said housing without protruding beyond said exhaust plane when said booster is secured to said housing, said plug being operable after release of said booster to translate longitudinally to an operating position protruding beyond said exhaust plane and presenting an optimal fixed nozzle exhaust area at said exhaust plane for design condition engine operation.

2. A missile as set forth in claim 1, including a core member rigidly affixed in nonmoving relationship to said engine, said exhaust plug disposed in concentric surrounding relationship to said core member.

3. A missile as set forth in claim 2, wherein said core member is of generally circular cross-section with an enlarged diameter adjacent said exhaust end defining a circular shoulder.

4. A missile as set forth in claim 3, wherein said exhaust plug is of generally circular cross-section of varying diameter with an open inner end and a closed outer end, the diameter of said inner end being less than the diameter of said shoulder, said inner end being in contact with said circular shoulder upon positioning said exhaust plug in said operating position.

5. An air breathing gas turbine engine adapted for use in a missile or like environment dimensionally limited in a longitudinal direction of exhaust gas flow from the engine, comprising:
- an engine housing having an open rear exhaust end;
- compressor, combustor, turbine and exhaust sections serially arranged in said longitudinal direction in said housing;
- a core member disposed generally centrally within said exhaust section and rigidly secured to said housing, said core member being of generally circular cross-section and having an enlarged diameter at a location adjacent the outer end thereof to define a circular shoulder; and
- an exhaust plug translatable in said longitudinal direction and having a closed outer end, an open inner end, and having a generally circular cross-section of varying diameter, the diameter of said inner open end being less than the diameter of said shoulder, said plug disposed in a stowed position prior to engine operation in generally nested, concentric, surrounding relationship to said core member lying totally within said housing without said closed end extending beyond said exhaust end of the housing, said plug translatable in said longitudinal direction from said stowed position to an operating position with said inner open end of the plug in engagement with said circular shoulder of the core member, said plug and core member cooperable with said housing to define an annular exhaust thrust nozzle having an optimal nozzle exhaust area at said exhaust end for design condition engine operation, said plug extending outwardly of said exhaust end in said operating position.

6. In an arrangement as set forth in claim 1 or 5, further including means for urging said exhaust plug toward said operating position.

7. In an arrangement as set forth in claim 6, wherein said core member includes a longitudinally extending, generally cylindrical outer wall of varying diameter whereby said outer wall is concavely curved in a longitudinal direction, said outer wall defining said shoulder.

8. In an arrangement as set forth in claim 7, wherein said core member includes a longitudinally extending cylindrical, generally constant diameter inner wall disposed within and concentric with said concave outer wall, said inner wall having an open outer end secured to said outer wall.

9. In an arrangement as set forth in claim 8, wherein said exhaust plug includes a longitudinally extending, generally cylindrical outer wall of varying diameter whereby said plug outer wall is convexly curved in said longitudinal direction, said convex outer wall disposed in generally concentric surrounding relationship to said concave outer wall.

10. In an arrangement as set forth in claim 9, wherein said exhaust plug includes a transverse end wall extending generally perpendicularly to said convex outer wall and presenting said outer closed end of the exhaust plug.

11. In an arrangement as set forth in claim 10, wherein said exhaust plug further includes a longitudinally extending, cylindrical, generally constant diameter inner wall having an outer end secured to said transverse end wall, said exhaust plug inner wall fitting closely inside said core member inner wall and being guided thereon for longitudinal translation relative to said core member.

12. In an arrangement as set forth in claim 11, wherein said core member inner wall has an opening therein and said exhaust plug inner wall has upstanding shoulder stop extending through said opening.

13. In an arrangement as set forth in claim 12, wherein said urging means includes spring means disposed between said core member inner and outer walls and extending between said core member and shoulder stop for urging said exhaust plug to move toward said operating position.

14. In an arrangement as set forth in claim 13, wherein said exhaust plug outer wall and transverse end wall are arranged whereby exhaust gas flow from said engine during operation thereof is received through said exhaust plug open end and defines said urging means for urging said exhaust plug toward said operating position.

15. In an arrangement as set forth in claim 6, wherein said exhaust plug is arranged whereby exhaust gas flow from said engine during operation thereof enters the interior of said exhaust plug through said open end thereof to exert a force on said closed end and define said urging means for urging said exhaust plug toward said operating position.

16. In an air breathing gas turbine propulsion engine disposed in a dimensionally limited environment within the housing of a missile:
- a stowable exhaust nozzle plug at the exhaust end of said engine, said plug disposed in a stowed position totally within the outer dimensions of said missile housing prior to engine operation, said stowed position being less than that required for optimal engine design condition operation, said plug translatable from said stowed position in the direction of flow of exhaust gases from the engine to a single operating position extending outside the exhaust end of said missile housing, said plug in said operating position presenting an optimal thrust exhaust nozzle exit area at design condition operation of said engine; and
- means for holding said plug in said stowed position prior to engine operating and for permitting translation of said plug to said single operating position upon operation of said engine.

17. In an engine as set forth in claim 16, wherein said means includes a power boost launcher secured to the missile covering said exhaust for holding said plug in said stowed position, said launcher being releasable from said missile for permitting said translation of the plug.

18. In an engine as set forth in claim 17, further including means for urging said plug toward said operating position.

19. A method of stowing and subsequently operating a subsonic missile propelled by an air breathing gas turbine engine during cruise and launched by a power boost launcher carried at the engine exhaust end of the missile, comprising the steps of:
- stowing the missile with said boost launcher attached thereto in a dimensionally limited environment, the engine having a thrust exhaust nozzle plug retracted totally within the missile without extending beyond said exhaust end while the missile is stowed;

launching said missile by firing said boost launcher, said plug remaining in said retracted position during operation of said boost launcher;

releasing said boost launcher from said missile after launching;

translating said plug outwardly to an operating position after said releasing step, said plug in said operating position extending beyond said exhaust end and presenting an optimal, fixed, thrust nozzle exhaust area at said exhaust end for subsonic design condition operation of said engine; and operating said engine after said translating step at substantially optimal subsonic design conditions to propel said missile during cruise.

* * * * *